(12) United States Patent
Bajenov et al.

(10) Patent No.: US 9,298,890 B2
(45) Date of Patent: Mar. 29, 2016

(54) PREVENTING UNAUTHORIZED ACCOUNT ACCESS USING COMPROMISED LOGIN CREDENTIALS

(75) Inventors: Andrei Bajenov, Palo Alto, CA (US); Jonathan H. Frank, Mountain View, CA (US); Matthew Knight Jones, Redwood City, CA (US); Alok Menghranjani, San Francisco, CA (US); Christopher William Palow, Palo Alto, CA (US); Allan Stewart, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 609 days.

(21) Appl. No.: 13/424,626

(22) Filed: Mar. 20, 2012

(65) Prior Publication Data
US 2013/0254857 A1 Sep. 26, 2013

(51) Int. Cl.
*G06F 21/00* (2013.01)
(52) U.S. Cl.
CPC .................................... *G06F 21/00* (2013.01)
(58) Field of Classification Search
CPC ......... G06F 21/31; G06F 21/00; H04L 67/02; H04L 63/083
USPC .................................... 726/4, 5, 6, 7, 13, 28
See application file for complete search history.

(56) References Cited

U.S. PATENT DOCUMENTS

| 2010/0211996 A1* | 8/2010 | McGeehan et al. ............... 726/4 |
| 2010/0229223 A1* | 9/2010 | Shepard et al. .................... 726/5 |

\* cited by examiner

*Primary Examiner* — Brandon Hoffman
*Assistant Examiner* — Nega Woldemariam
(74) *Attorney, Agent, or Firm* — Fenwick & West LLP

(57) ABSTRACT

User login information submitted as part of an attempt to log into a computer system is evaluated for unauthorized or illegitimate use based on indicators of suspicious behavior. Example indicators of suspicious behavior include whether the login information is known to have been compromised, whether the login attempt originates from a network source or a physical source that has previously originated an attempt to log in using login information known to have been compromised, and whether multiple login attempts using the login information from multiple users has originated from the source. A suspicion index can be calculated based on the presence of the indicators of suspicious behavior. The system can require enhanced authentication based on the measurement of suspicious behavior.

10 Claims, 4 Drawing Sheets

PREVENTING UNAUTHORIZED ACCOUNT ACCESS USING COMPROMISED LOGIN CREDENTIALS

BACKGROUND

The present disclosure relates to user account security for accounts accessible through a communications network. Specifically, the present disclosure relates to preventing unauthorized account access using compromised login credentials.

User login information (for example, a user identifier, a password, a user-specific image, etc.) can be compromised by a malicious party using any of a variety of methods. For example, a malicious party can obtain multiple sets of login information using a fraudulent website masquerading as a legitimate one. These phishing sites prompt users to provide confidential information, such as user names, passwords, account numbers, and the like, in order to collect this information for illegitimate purposes. Another method by which a malicious party can obtain a large collection of login information is through hacking. That is, a hacker can gain unauthorized access to a protected system, thereby acquiring secure user information, including login information (e.g., user identifiers and corresponding passwords), social security numbers, etc. Once acquired, the login information can be used for illegitimate purposes, sold, published, or distributed, thereby disrupting the experience of users and compromising the security of the website as a whole.

While users can be trained to recognize phishing sites and to monitor the integrity of their login information, security breaches can still occur. To limit the effect of a security breach, a website may implement security systems and methods to determine whether a user session is legitimate and whether the user session has been initiated by an unauthorized person using illegitimately obtained login information.

SUMMARY

Embodiments of the invention allow for authentication of user login information based on information associated with a user login attempt. A list of known compromised login attempts is received, wherein a login attempt can include a user account identifier and a password. A first set of login information submitted from a client device is received, wherein the first attempt includes a submitted user account identifier and a submitted password. It is determined whether the first set of login information matches an entry in the list of compromised login attempts. If the first set of login information matches a compromised login attempt, a source location of the first login attempt is identified. A measure of suspiciousness of the source location is then associated with the first attempt. The measure of suspiciousness includes whether the first set of login information matches a compromised login attempt.

The features and advantages described in this summary and the following detailed description are not all-inclusive. Many additional features and advantages will be apparent to one of ordinary skill in the art in view of the drawings, specification, and claims hereof.

Figure 1:
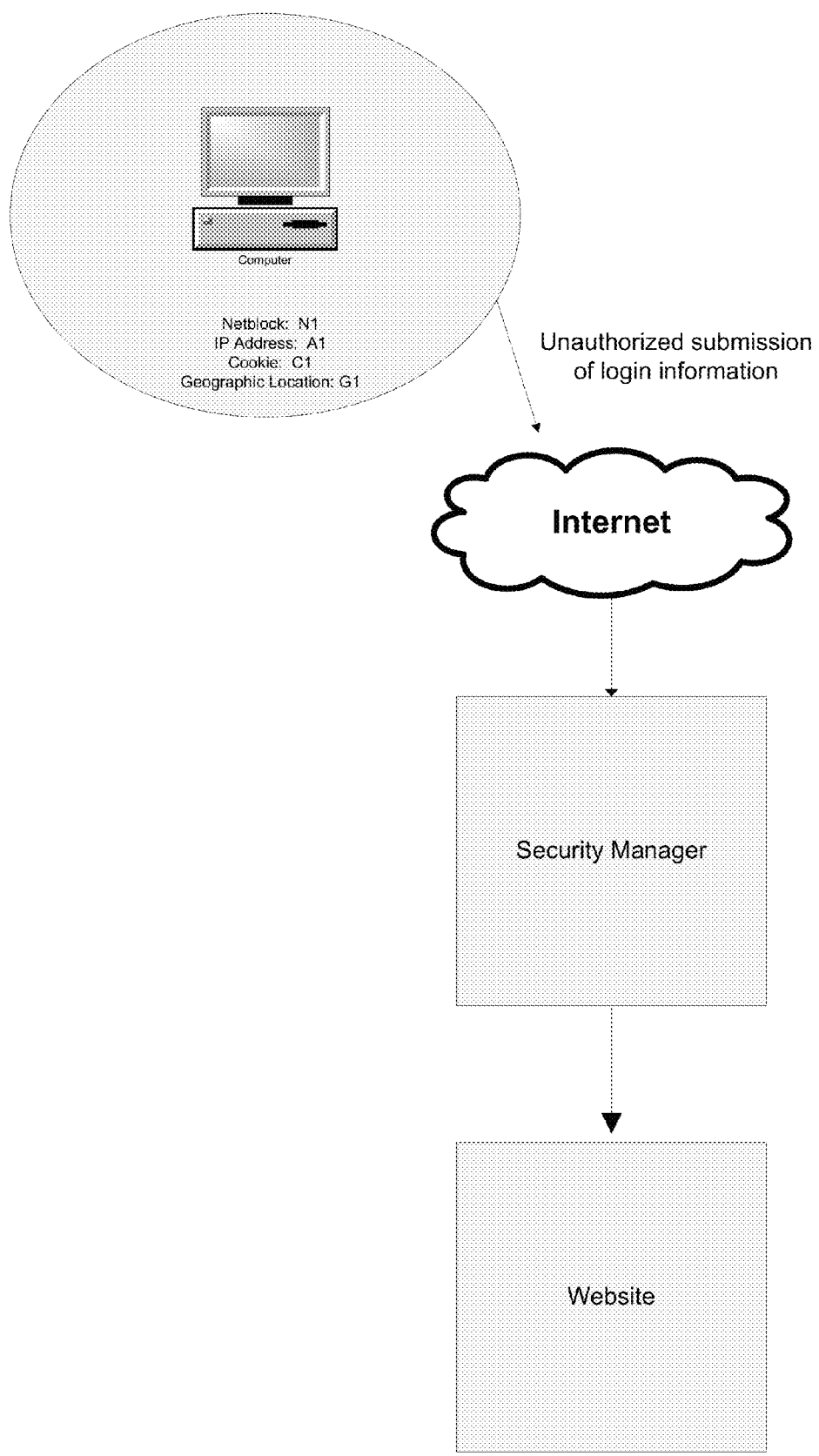
FIG. 1 is a high-level diagram illustrating an attempt to log in to a website from a source location that can have suspicious characteristics.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

As website, internet, and mobile application ("app") use has become more pervasive and sophisticated (including transactions such as, e.g., finance, banking, commerce, social media, etc.) attempts by malicious parties to gain unauthorized access to user accounts and private user data has also increased. One aspect of malicious activity is the market in user account information. That is, having acquired user account and login information, a malicious party can not only access the various websites and apps directly, but also share the acquired information with other malicious parties. The malicious parties may then attempt to use the information from the convenience of a computing device or a source location.

In an effort to maintain the integrity of websites and user accounts, website operators can record, and optionally share with other legitimate content providers, user login information that is known to have been compromised, thereby building a reference of known compromised login information. Access to user accounts by login attempts (wherein a login attempt is an attempt to use a set of login credentials from a given login location at a given time to access a user account) using this compromised login information can be restricted or limited.

Furthermore, the source location of the login attempt using the known compromised login information can also be identified, and recorded by the website operator. Subsequent login attempts from this source location can be denied or subjected to additional security challenges based on the association of the prior submission of compromised login information with the previously identified source location. Identifying this association between the prior submission and the source location can prevent a malicious party from gaining access to user accounts whether or not the submitted login information is known to have been compromised. In other words, login attempts (even a small number of attempts) from a common source location made using login information that is known compromised (e.g., appearing on list of known compromised login information) can be used to identify all login attempts from that common source location as suspicious, whether the attempt uses known compromised login information or not.

In some examples of the present disclosure, access to a user account may be conditioned on a comparison of the submitted login information to the list of known compromised login information. The list of known compromised login information can include login information that is valid for multiple websites, and need not be limited to information valid for only a single website. In other examples, the source location of a suspicious login attempt is identified, recorded and used, in part, to determine whether the login attempt is suspicious. For example, if a login attempt originates from a source location that previously originated a login attempt using login information known to have been compromised, the login attempt may be subjected to additional security protocols to verify the legitimacy of the attempt. In further examples, these comparisons, and others, can be used as factors in the synthesis of a suspiciousness index that measures whether a login attempt is suspicious and whether access to the user account should be granted.

For clarity, certain terms are defines as follows. Login credentials include a unique identifier or identifiers of a user and a secret that is shared between the user and a website provider. Example identifiers include, for example, a username, an email address, and an account ID. Example secrets associated with an identifier include a password, a passphrase, a symmetric encryption key, biometric values, etc. Compromised login credentials are those login credentials that are known to someone other than either the owner of the credentials or the website provider. A login location is a set of data describing the source of a login attempt. Login information includes a set of data associated with a login attempt, including login credentials, a login location, and any related or derivative data.

FIG. 1 illustrates an example of a scenario in which a malicious party, having acquired a collection of login information known to have been compromised, can attempt to access user accounts from a source location. As shown, the client device 104, operated in this example by a malicious party, at a source location 108, is in communication with a network 112. The network 112 provides access to a website 116 by passing security protocols administered by a security manager 114.

While the client device 104 is depicted as a desktop computer in FIG. 1, those skilled in the art will appreciate that the client device 104 may also be embodied by a laptop computer, a tablet computer, a smart phone, a networked gaming device, or any other device that includes computing functionality and data communication capabilities.

The source location 108 of the client device 104 can be characterized by one or more of a netblock (N1), or an IP address (A1). As known to those skilled in the art, a netblock is a set of internet protocol (IP) addresses that are grouped together. For example, a netblock can be represented as a range of IP addresses comprising a start IP address and an end IP address. Also, a netblock may be associated with an organization or a location. Other source location 108 identifiers include a machine cookie (C1), a geographic location (G1), or other means of identifying a source location. The source location 108 may also be identified through the internet service provider ("ISP") used to connect the client device 104 to the network 112 or the originating Autonomous System ("AS") number for the IP address or netblock that can identify the IP owner. Those skilled in the art will appreciate that other methods and systems can be used to identify a source of a client device.

The network 112 may comprise any combination of local area and/or wide area networks, cellular communications networks or other radio frequency communication networks, the Internet, light-based communication networks, and any combinations thereof using both wired and wireless communication systems and methods.

The security manager 114, operated within a system 200 (depicted in FIG. 2) by a server or other computing device, may perform security functions and administer user challenges that comprise one or more computer applications including, but not limited to, a firewall, a security web application, a virtual appliance, and other embodiments of applications used to improve the security of a website or computer system known to those skilled in the art. Similarly, the website 116 may also comprise one or more applications, in communication with the network 112, that are operated by a server or other computing device. Additional details of the security manager 114 and the website 116 are described in the context of FIG. 2.

System Environment

Figure 2:
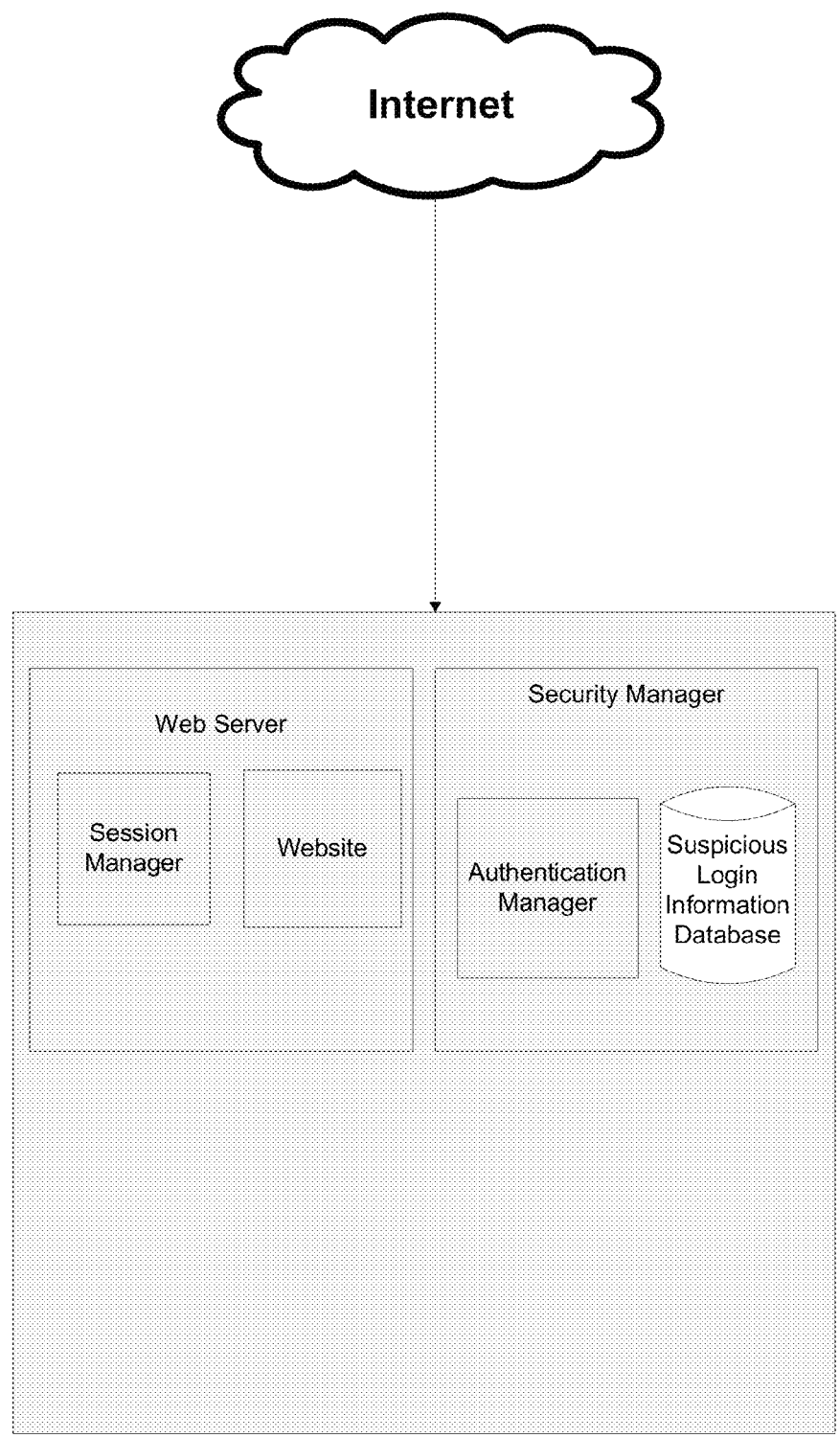
FIG. 2 is a diagram of an embodiment of a system architecture of a website having features capable of implementing the examples of the present disclosure.

FIG. 2 is a high level block diagram illustrating the exemplary system environment 200 suitable for operation of the website 116, and which may be used to implement the systems and methods used to prevent unauthorized access to a user account as described herein. The system environment 200, in communication with the website 116 and the network 112, includes the security manager 114, a web server 208, an authentication manager 212, a session manager 216, and a suspicious login information database 220.

As shown, the website 116 may be operated using the web server 208 serving, for example, websites and other web-related content, such as Java, Flash, XML, and other applications well known to those skilled in the art. The web server may include a mail server and other functionality for receiving and routing messages and web-based content to and from client devices.

While the website 116 is depicted in FIG. 2, those skilled in the art will appreciate that the term "website" is used for brevity and includes mobile applications ("apps") and other means of communicating through a communications network and is limited only to a website. The content or intended use of the website 116 (or e.g., mobile application) is not limited. For example, the website 116 may include a social networking system. A social networking system comprises a computing system that allows users to communicate or otherwise interact with each other, and access other content available through the website. The social networking system stores user profiles that describe the users of a social network, including biographic, demographic, and other types of descriptive information, such as work experience, educational history, hobbies or preferences, location, and the like. The social networking system further stores data describing one or more connections between different users. The connection information may indicate users who have similar or common work experience, group memberships, hobbies, or educational history. Additionally, the social networking system includes user-defined connections between different users, allowing users to specify their relationships with other users. For example, these user-defined connections allow users to generate relationships with other users that parallel the users' real-life relationships, such as friends, co-workers, partners, and so forth. Users may select from predefined types of connections, or define their own connection types as needed. Other features of an exemplary social networking system are described in more detail below.

The authentication manager 212, which provides a variety of security functions in response to user login attempts, obtains information used to synthesize a suspicion index, which characterizes the suspiciousness of the login attempt. For example, the authentication manager 212 can analyze the information received from the client device 104 to identify information associated with the client device. The authentication manager 212 can also identify the source location and/or IP address of a client device (e.g., N1 and or A1 for client device 104) used by the client device for communicating with the website 116, identify machine cookies stored on client device 104, or install a machine cookie so as to make the client device 104 or 108 identifiable in a subsequent session. The authentication manager 212 can be a web appliance or module that operates on a web server, for example the web server 208. The operation and function of the authentication manager 212 in connection with other modules of the system 200 will be described in more detail below.

The session manager 216 handles sessions created by the client device 104 during interactions with the website 116. For example, a session is created by the session manager 216 when a user uses his client device 104 to log into the website 116. The session manager 216 can also fetch web pages from the web server 208.

The suspicious login information database 220 records information entered by an administrator of the system 200 or identified by the authentication manager 212 as suspicious. As described in more detail below, suspicious information can include, for example, login information known to have been compromised or a source location known to have previously originated a login attempt using login information known to have been compromised. The database 220 can use any type of storage medium known in the art. The database 220 can also store information using remote physical storage provided by a third party. The database 220 can also store information in the "cloud." Those skilled in the art will appreciate the variety of embodiments for a database that can be used for the database 220.

In other embodiments, the system environment 200 may include additional, fewer, or different modules for various applications. Conventional components such as network interfaces, security mechanisms, load balancers, failover servers, management and network operations consoles, and the like are not shown so as to not obscure the details of the system.

Synthesis of the Suspicion Index

With continuing reference to FIG. 2, upon a login attempt, the authentication manager 212, operating in cooperation with the security manager 114, receives login information from a user and evaluates the authenticity of the login information and other information associated with the login attempt. The authentication manager 212 communicates with the security manager 114 in order to calculate a measurement of suspicion, or suspicion index, associated with the login attempt. This suspicion index, described in more detail below, can be used, for example, to determine whether the login attempt will be subjected to additional security protocols by the authentication manager 212.

If the login information and login attempt are deemed authentic, then the authentication manager 212 can provide access to the user to the user account. Alternatively, if the login information is determined to be illegitimate, not authentic or otherwise not valid, then the authentication manager 212 may immediately reject the login attempt, thereby denying access to the user account.

The authentication manager 212 may also take steps to verify the legitimacy of the login attempt if the legitimacy of the attempt appears to be ambiguous. For example, the authentication manager 212 may identify the source location from which the rejected login attempt originated and share the information with the security manager 114 and the suspicious login information database 220 as part of the synthesis of the suspicion index. The suspicion index, the operation of the security manager 114, and the role of the suspicious login information database 220 are described in more detail below.

As mentioned above, the security manager 114 may interact with the authentication manager 212 and the suspicious login information database 220 to synthesize a suspicion index that characterizes the legitimacy of the login attempt, the authenticity of the user, and/or the suspiciousness associated with the source of the login attempt. In this context, the suspicion index can be synthesized according to an algorithm that weights various indicators of suspiciousness (e.g., source, geographic location, presence of information associated with the login attempt in the suspicious login information database 220, etc.) in any desired combination. In one example, the suspicion index can be in the form of a numerical score assigned to a user session, indicating the probability that the session is created by an unauthorized or illegitimate user. In another example, the suspicion index can be a value from a predetermined set of values indicating the degree of suspicion associated with the session's authenticity, for example, a low, a medium, or a high degree of suspicion. In yet another example, the suspicion index can be a binary value indicating whether the user session is safe or not safe. The suspicion index associated with a session may be provided to other modules or systems within the system 200 in real-time as new sessions are created. Alternatively, the suspicion index may be used by off-line applications that perform batch processing. For example, an application can perform statistical analysis of illegitimate activity associated with user accounts on the system 200.

As part of the synthesis of the suspicion index, the security manager 114 may receive login information and source location information identified by the authentication manager 212 and may analyze the information for suspicious characteristics. An example of a suspicious characteristic is, as described above, the number of login attempts made using different sets of login information originating from a single source location, e.g., netblock N1, IP address A1, machine cookie C1, or geographic location G1. For example, if a source location has been an origin for at least one previous login attempt using login information known to have been compromised, then any subsequent login attempts from that source may be regarded as suspicious and subjected to additional security protocols. In another example, if multiple login attempts using different sets of login information have been made from a single source location or client device, it could indicate that a malicious party has obtained a list of compromised login information and is systematically attempting to access the user accounts associated with the compromised login information. Other criteria, considerations, and heuristics that can be used to determine whether a login attempt is suspicious will be discussed in more detail below in the context of FIG. 3.

Exemplary Heuristics Used for the Suspicion Index

Figure 3:
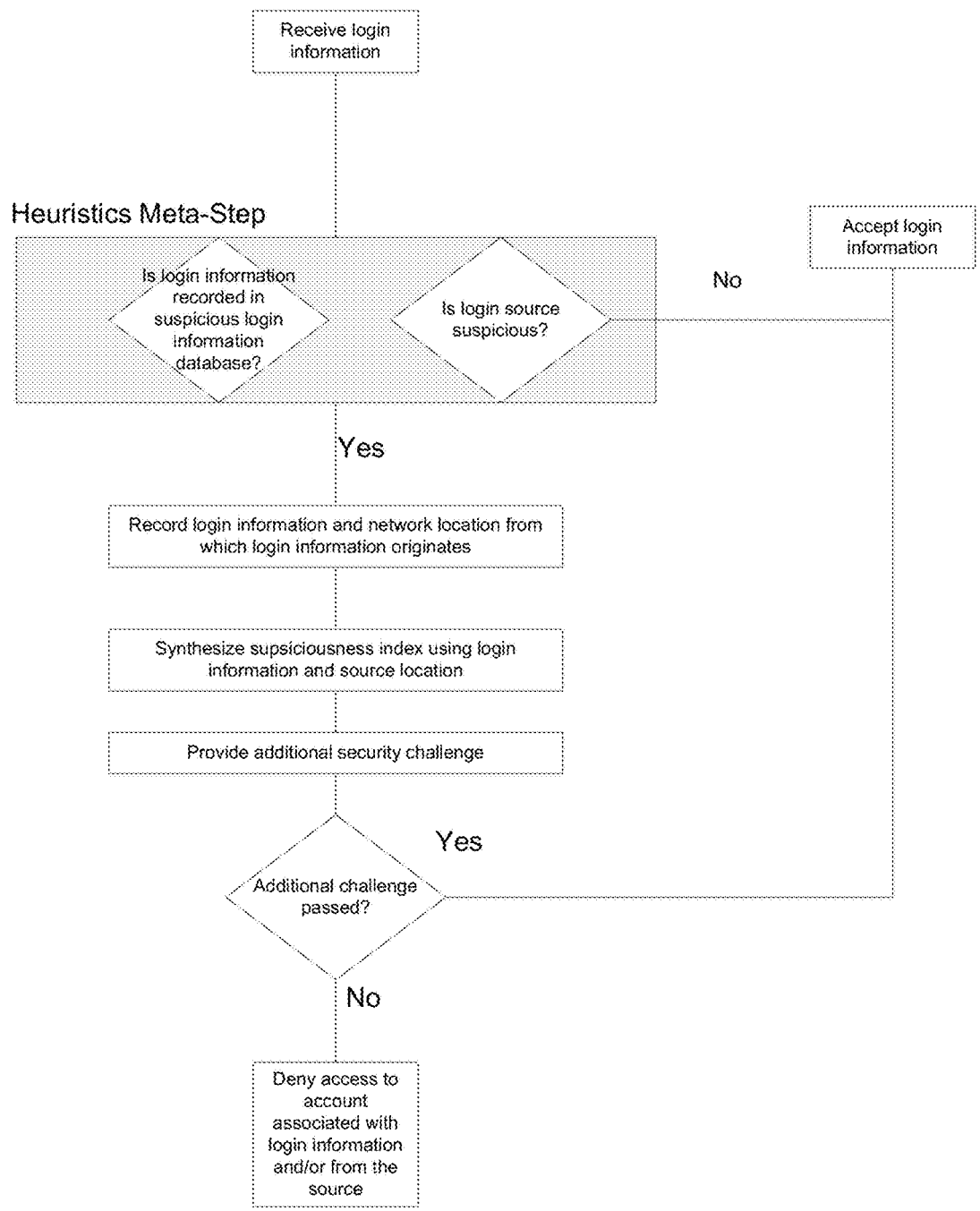
FIG. 3 is a high-level flowchart of an exemplary method for evaluating the legitimacy of login information provided in connection with a login attempt.

FIG. 3 illustrates an exemplary method 300 that may be used by the security manager 114 to evaluate the legitimacy of a login attempt, to optionally determine the suspicion index, and to take action based on the foregoing. At step 304, the login information to be evaluated is received by, for example, the system 200 described above. The submitted login information is evaluated at heuristics meta-step 308, at which either or both of steps 312 and/or 316 may be performed. At step 312, the submitted login information is compared to information recorded within the suspicious login information database 220 to determine if, for example, the information is known to have been compromised, or if submitted login information is associated with a previous suspicious login attempt. At step 316, the source of the login information, supplied by the session manager 216 as explained above, is compared to information recorded within the suspicious login information database 220. Those skilled in the art will appreciate that steps within meta-step 308 can be performed in any order or combination without necessarily affecting the result of the meta-step 308 as a whole.

If the submitted login information is not deemed suspicious at meta-step 308, then, as shown at step 320, the login information may be accepted and the account accessed by the user submitting the login information.

If either of the steps within meta-step 308 indicates suspicious characteristics associated with the login attempt, then method 300 records any relevant information for future reference at step 324.

Upon determining the suspiciousness of the login information and/or the source at heuristics meta-step 308 and identifying the location of the login attempt and recording it at step 324, a suspicion index is calculated at step 336. The suspicion index can be synthesized using any number of algorithms that employ the various suspiciousness factors described herein, as well as other factors.

At step 340 an additional security challenge may be provided to the user as a means of overcoming the suspicious characteristics associated with the login information and/or the source of the login information. In some embodiments of step 340, the level of authentication required for a session is determined based on the degree of suspiciousness associated with the login information, the source location, or both. For example, as part of an enhanced authentication process, the authentication manager 212 may request a preselected set of security related questions for which the user has previously provided answers. In another example, the authentication manager 212 may require the user to enter a security code that is sent to the user through email or an SMS message sent to the user's mobile phone. In a further example, a social CAPTCHA system can be applied by the authentication manager 212, as described in U.S. application Ser. No. 12/399, 723, filed Mar. 6, 2009, which is incorporated herein by reference. Other types of security challenges are well known to those skilled in the art and can be applied to the operation of the authentication manager 212.

The success or failure of the authentication procedure is determined at step 344, at which access to the user account is either granted at step 320 or denied at step 348. In some embodiments, a login attempt that is not successfully authenticated may be permitted partial access to the user account, such that access to any sensitive information is disallowed. Furthermore, a login attempt that is not successfully authenticated may be monitored more closely for any suspicious activity and terminated if activities of the session are indicative of a behavior considered not safe (e.g., spamming).

Figure 4:
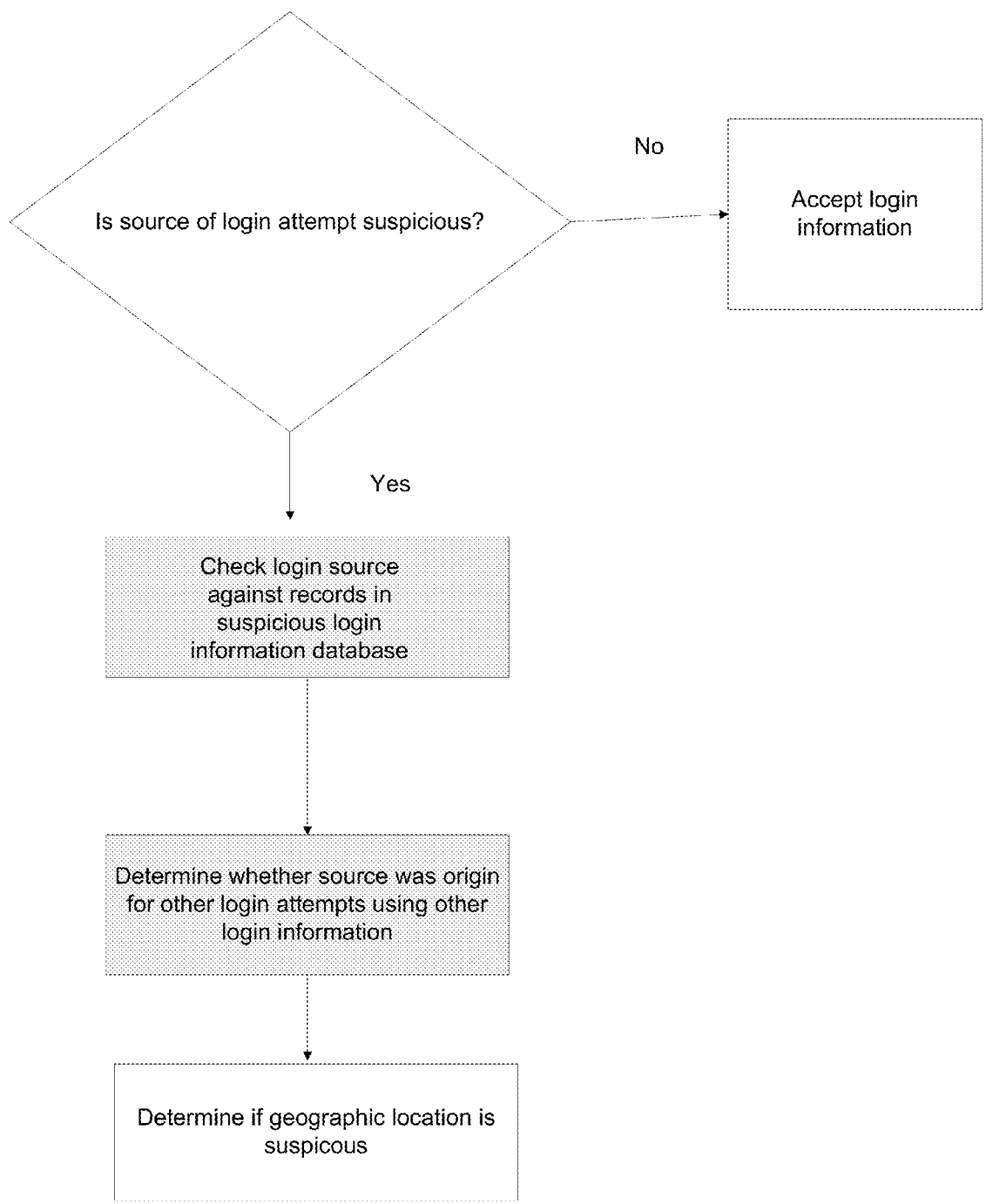
FIG. 4 is a flowchart of an example sub-process by which a source location can be identified as suspicious by testing the submitted login information or the source location for suspicious characteristics.

FIG. 4 depicts one embodiment of a method 400 that further illustrates the substeps within step 316 of method 300. Method 400 employs exemplary heuristics that may be used to synthesize a quantitative or qualitative suspicion index for a login attempt or source location from which the login attempt originates, as described above at step 316 of method 300. At step 404, the source location of the login attempt is determined and the suspicious login information database 220 is searched to determine if the source location has been scrutinized in the past for suspicious behavior. For example, even though the login information is not recorded in suspicious login information database 220, a prior suspicious login attempt could have originated at the source location thereby suggesting that, for example, a malicious party is attempting to access a number of user accounts using an ill-gotten collection of login information. Similarly, at step 408, the source location of the login attempt can be checked to see if multiple sets of login information corresponding to multiple users have originated from the source location, possibly indicating unauthorized or illegitimate use of the login information.

At step 412, the geographic location of the source is determined and evaluated for suspicious indicators. For example, as described in U.S. Patent Publication No. 2010/0211996 at, for example, paragraph 35, and incorporated by reference herein in its entirety, a deviation from the usual geographic location of a source location can indicate unauthorized use of a user's login information. For example, if a user typically accesses his account from his home in Santa Clara or at his work in Palo Alto, then an attempted login attempt from New Mexico could be indicative of an unauthorized use of his login information. This then can prompt additional security challenges and protocols as described herein.

Upon performing some or all of the steps described, a suspicion index can be synthesized by the security manager 114, as described above, with appropriate action taken.

Additional Heuristics Factors

Another aspect of an analysis that may be used to determine whether attempts to access multiple user accounts from a single source location is suspicious includes the timing characteristics of the various login attempts. That is, that the security manager 114 may incorporate into the calculation of the suspicion index the time scale over which login information is submitted, the frequency of submissions, the time of day at which the submissions are received, or the interval between submissions originating from a source location. For example, the security manager 114 may identify a source location as suspicious if the security manager 114 receives multiple sets of login information from the single source location over a relatively short period of time. Those skilled in the art will appreciate that other indicia of suspicious use include, but are not limited to, internet service provider identity, geographic location of the client device, and other indictors known to those skilled in the art.

As part of this analysis, the security manager 114 may also consider the expected behavior of the source location, if known. For example, the security manager 114 may determine that a source location submitting multiple sets of login information is not suspicious if the source location is a publicly accessible client device at, for example, a public library or hotel. Other characteristics of these types of devices may include login information submissions made at regular intervals during business hours. Those skilled in the art will appreciate that other heuristics may be developed to identify suspicious login behavior.

In addition to recording known suspicious or compromised login information and source locations, the suspicious login information database 220 may also contain a white list of source locations exhibiting suspicious behavior but known not necessarily to be a source of malicious conduct. For example, as mentioned above, client devices used at a public library may exhibit some indicators of suspicious behavior (e.g., multiple sets of different login information supplied from a single source location). These source locations can be added to a white list so that legitimate users accessing their account from such a location are not rejected. In another embodiment, login attempts from these locations can induce additional security challenges in order to confirm that a user is legitimate. Furthermore, other client devices or source locations exhibiting suspicious behavior can be added to a white list if such suspicious behavior is known to be part of the normal operation of the source location or client device.

Social Media Applications

The systems and methods described herein can be applied to the security and system integrity of a social network system. A social networking system provides various mechanisms to its users to communicate with each other and to obtain information about their connection that they might find interesting, such as activities that their connections are involved with, applications that their connections are installing, and comments made by connections on activities of other connections. These mechanisms include email, notifications, newsfeeds, and the like. Users of a social networking system can view information related to other users, for example, their profile information, photos, and the like. Interactions between users on a social networking system may be analyzed to determine if two users are close connections or not. For example, two users with very frequent interactions through emails or other activities in the social networking system are likely to be closer connections than users with minimal activity between them.

Social graph information associated with a user may be used for determining safe locations for a user, thereby enabling some of the embodiments described above. For example, a location may be considered safe for a user if the location is known to be safe for one of the connections of the user. A physical or geographical location may be considered safe for a user if the geographical region is known to be safe for several of the user's connections. Similarly, a machine cookie can be considered safe for a user if the machine cookie is known to be a safe location for a user's connection. In a situation where a location is not known to be safe for a user but is known to be safe for the user's connections, it is likely that the user is using a machine of a connection or using a machine from the geographical location of the user's connections.

In some embodiments a score is assigned to connections of a user to determine if the connections are close before using the particular connection for determining safe locations. In some embodiments, heuristics may be used to determine how close a connection is to a user before using the connection's information for determining safe locations. That is, the list of connections of a user may be restricted to connections with whom the user has interactions indicative of a close friendship, for example, connection with whom the user has frequent interactions using messages, connections that have been tagged with the user in the same photo, or other types of interactions. In some embodiments, a location may be considered safe for a user if the location is considered safe for any of the connections of the user or any of the connections of the connections of the user.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms. These algorithmic descriptions are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
   receiving a list of login credentials for a plurality of users, the list comprising a plurality of user account identifiers, each user account identifier being associated with a password, the login credentials on the list being known to have been compromised due to the list of login credentials having been obtained by a malicious party;
   receiving first login information submitted from a client device in connection with an attempt to login to an online system, the login information including a submitted user account identifier and a submitted password;
   determining whether the received first login information matches login credentials on the list of known compromised login credentials;
   responsive to the received first login information matching any of the known compromised login credentials on the list,
      identifying a source location from which the first login information was received, and
      determining that the source location may be suspicious since the first login information is on the list, however the attempt to login could be a valid attempt by a valid user who is an owner of the first login information;
   receiving second login information submitted from a client device in connection with an attempt to login to an online system, the second login information being different from the first login information;

responsive to the received second login information matching any of the login credentials on the list of known compromised login credentials,
 identifying a source location from which the second login information was received,
 determining that the source location from which the second login information was received is the same as the source location from which the first login information was received,
 based on the determination, requiring a security challenge associated with the attempt to login to the online system with the second login information, and
 based on a failure to meet the security challenge, denying the attempt to login to the online system with the second login information; and
denying login for each subsequent login attempt from the same source location, including denying login attempts with login information that is not on the list of known compromised login credentials.

2. The computer implemented method of claim 1, wherein the security challenge includes requiring an additional password.

3. The computer implemented method of claim 1, wherein the security challenge includes providing a challenge-response test verifying that the first attempt is initiated by a human user.

4. The computer implemented method of claim 1, wherein the source location associated with the first login information is identified by an IP address.

5. The computer implemented method of claim 1, wherein the source location associated with the first login information is identified by a netblock.

6. The computer implemented method of claim 1, wherein the source location associated with the first login information is identified by a machine cookie.

7. The computer implemented method of claim 1, wherein the source location associated with the first login information is identified by a geographic location of the first attempt.

8. The computer implemented method of claim 7, wherein the geographic location includes a comparison of a prior geographic source location to a geographic source location of the first attempt.

9. The computer implemented method of claim 1, wherein the source location associated with the first login information is identified by an internet service provider.

10. The computer implemented method of claim 1, wherein determining that the source location from which the first login information was received or from which the second login information was received is suspicious comprises determining a suspiciousness index based on at least one of a geographic location, an IP address, and a netblock.

* * * * *